Jan. 25, 1966 R. C. STALLMAN 3,230,887
EVEN FLOW APPARATUS AND METHOD FOR FLUID
GRADIENT ENGINES AND THE LIKE
Filed Oct. 29, 1962 4 Sheets-Sheet 1

INVENTOR.
RICHARD C. STALLMAN
BY
*Flehr and Swain*
ATTORNEYS

Jan. 25, 1966

R. C. STALLMAN 3,230,887

EVEN FLOW APPARATUS AND METHOD FOR FLUID
GRADIENT ENGINES AND THE LIKE

Filed Oct. 29, 1962

INVENTOR.
RICHARD C. STALLMAN
BY

*Flehr and Swain*

ATTORNEYS

INVENTOR.
RICHARD C. STALLMAN

*INVENTOR.*
RICHARD C. STALLMAN
BY
*Flehr and Swain*
ATTORNEYS

United States Patent Office 3,230,887
Patented Jan. 25, 1966

3,230,887
EVEN FLOW APPARATUS AND METHOD FOR FLUID GRADIENT ENGINES AND THE LIKE
Richard C. Stallman, San Carlos, Calif., assignor to Beckman Instruments, Inc., a corporation of California
Filed Oct. 29, 1962, Ser. No. 233,654
4 Claims. (Cl. 103—5)

This invention relates to fluid flow apparatus and more particularly to apparatus which converts a pulsating flow such as from a reciprocating pump to an even flow.

It is often necessary, particularly in centrifuging operations, to feed two fluids simultaneously at a constant overall flow rate. In addition, it is often desirable to provide a variation in the concentration or proportion of the two liquids to be fed. Since accuracy is of prime importance in operations of this type, it is desirable to employ reciprocating pumps such as those which utilize plunger type syringes.

The use of plunger type syringes, however, presents the problem of providing an even flow of fluid since the syringes and other types of reciprocating pumps inherently provide a pulsating flow. While this pulsating flow may be evened out by the use of several pumps operating in parallel, such operation multiplies the requirements for close tolerances in manufacture and usage. In addition, parallel operation requires the expense and space for the several additional pumps.

The reciprocating pumps of the prior art are drawn by crank arrangements and thus the piston is at rest for only a short time. During this time the associated valves must be operated to make the connection between intake and exhaust. As a result the accuracy of delivery becomes dependent upon the valve. Furthermore, as the pumping speed is increased the accuracy changes due to the fact that the valve cannot operate instantaneously.

It is, therefore, a general object of this invention to provide an improved apparatus and method for producing an even output for pulsating type pumps.

It is a further object of this invention to provide apparatus and method for producing an even outflow of continuously and accurately mixed fluids.

It is still another object of the present invention to provide apparatus of the foregoing character in which the pulsating pump is cam driven and includes relatively long dwell periods permitting operation of the valves to selectively provide intake and exhaust.

It is still a further object of this invention to provide apparatus of the aforementioned character wherein an auxiliary pump is placed in the output line of a pulsating flow and wherein the auxiliary pump, during the time of flow draws in a portion of the pulsating output; and, during the non-flow time of flow exhausts that portion of the output which it has previously withdrawn to provide an even flow.

These and other objects of the invention will become more clearly apparent upon a review of the following description in conjunction with the accompanying drawing, in which.

For better understanding of the description of this invention, the definitions used for the several types of fluid flow considered herein are deemed appropriate. Thus, the term "continuous," when related to fluid flow, denotes that the flow is not limited by finite volumes of fluid but that it may be continued for an indefinite period of time dependent only upon the need for the fluid, and possibly the total time of single rotation of a programmed stop which will be explained more fully hereinafter. But even the total time of rotation for the programmed stop is not a limit to the volumes if the variation of the fluid ratio is a repetitive one.

The term "constant" is used to define a flow which is constant over a period of time but not necessarily constant in the instantaneous sense. Thus, a "constant" flow may include a pulsating flow as well as a non-pulsating flow.

An "even" flow is one in which no pulsations occur although the rate may be continuously varied.

Figure 1:
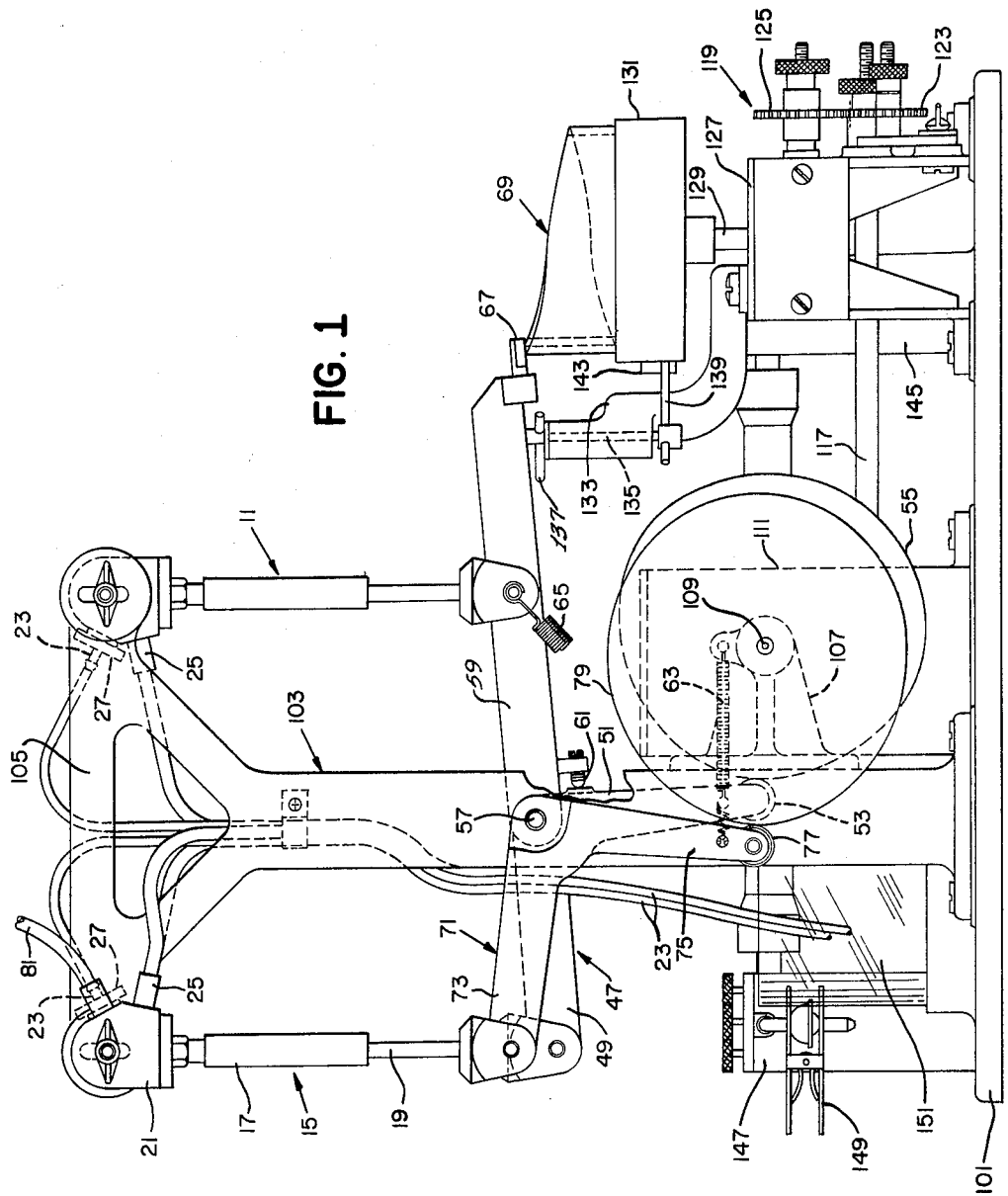
FIGURE 1 is a front elevational view of an apparatus in accordance with this invention.
Figure 2:
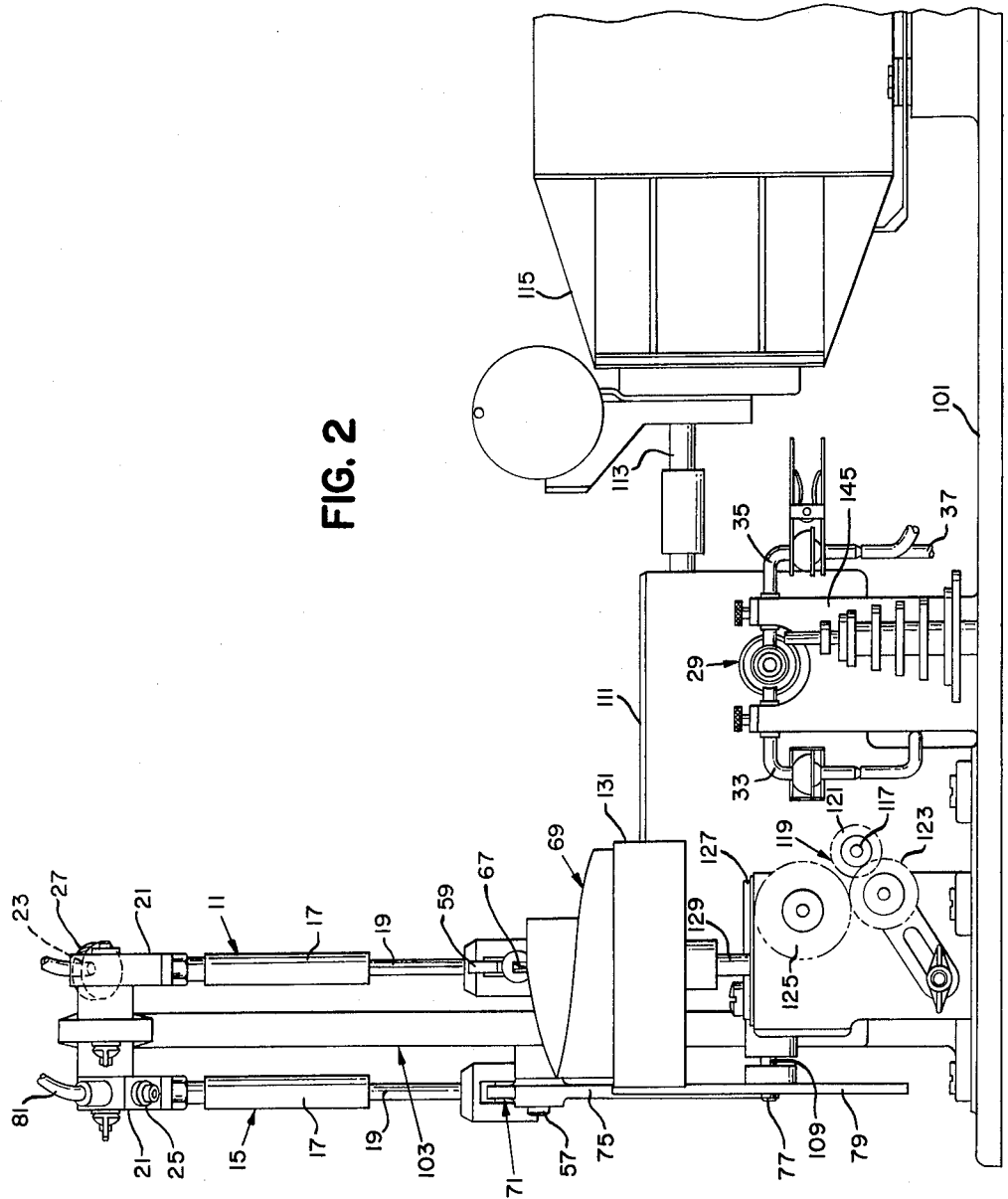
FIGURE 2 is a side elevational view of the apparatus shown in FIGURE 1.
Figure 3:
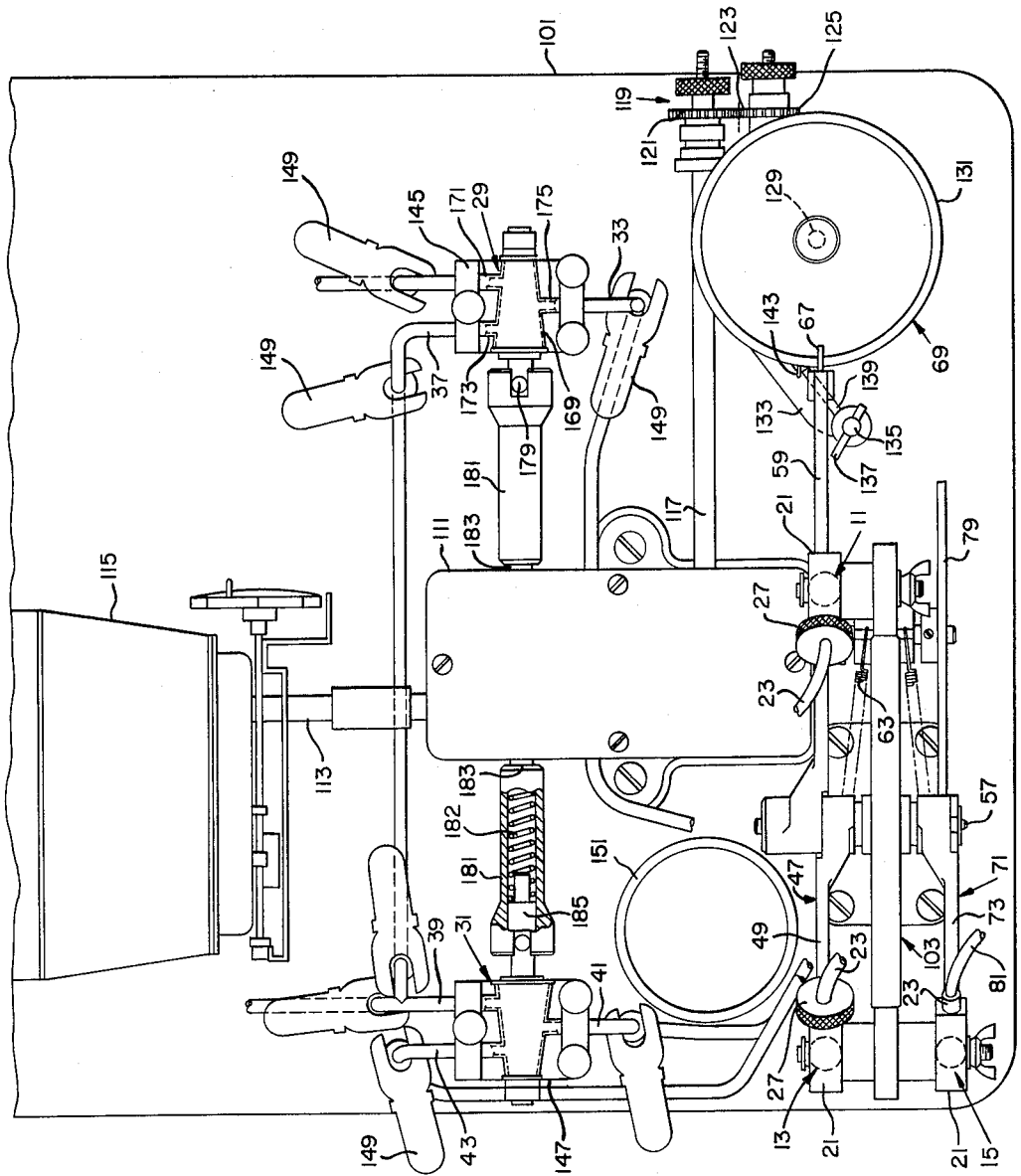
FIGURE 3 is a plan view of the apparatus shown in FIGURES 1 and 2.
Figure 4:
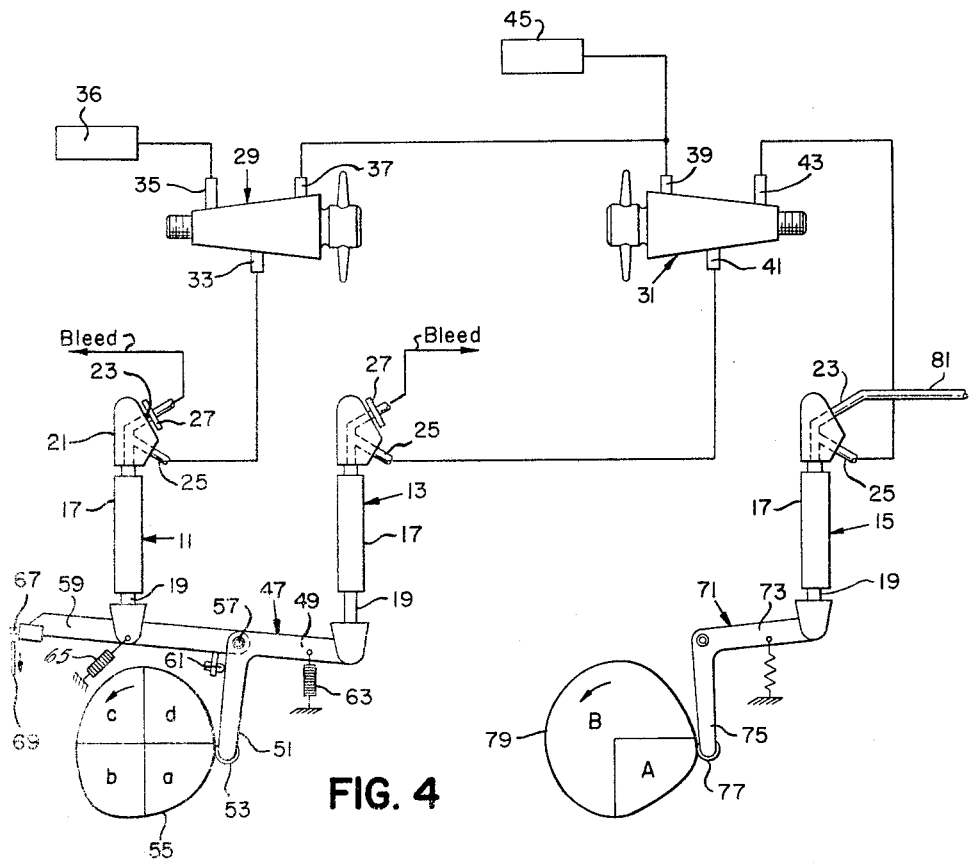
FIGURE 4 is a schematic view of the embodiment shown in FIGURES 1 to 3.

While the preferred embodiment of the apparatus in accordance with the invention is shown in FIGURES 1 to 3, the principle of operation may be more clearly understood with respect to the schematic diagram of FIGURE 4.

Thus, in FIGURE 4 there is shown a ratio pump 11, a mixing or master pump 13 and an auxiliary pump 15. Each of the pumps 11, 13 and 15 may be considered a syringe of the same type and size including a hollow syringe barrel 17 having a syringe plunger 19 slidably retained therein.

At the upper end of each of the syringes 11, 13 and 15 is a manifold assembly 21 having two input-output lines 23 and 25. In the syringes 11 and 13 the lines 23 include a valve 27 which may be opened or closed whereby the individual syringe may be bled. The line 23 of the syringe 15 may be considered the final output of the apparatus. The lines 23 and 25 of each of the syringes are interconnected and in communication with their associated syringe barrel 17.

There are also included two stop cock assemblies 29 and 31 each of which serves as a two-way valve. The asesmbly 29 includes one stationary line 33 in fluid communication with the syringe 11, and a second stationary line 35 in fluid communication with a source 36 of a first fluid. A third stationary line 37 of the assembly 29 is in fluid communication with a stationary line 39 of the assembly 31. A stationary line 41 of the assembly 31 communicates with the syringe 13 while a stationary line 43 of the assembly 31 communicates with the syringe 15. In addition, to its fluid communication with the line 37, the line 39 communicates with a source 45 of a second fluid.

Although a detailed description of the stop cock assemblies 29 and 31 will be presented hereinafter, for the explanation of the schematic diagram of FIGURE 4, it is sufficient to realize that the assembly 29 connects the line 33 alternately with the lines 35 and 37. Similarly, the assembly 31 connects the line 41 alternately with the lines 39 and 43. In the actual operation of the stop cocks there is a dwell period between the interconnection of alternate lines.

For the operation of the syringes 11 and 13, a bell crank 47 has one arm 49 pivotally connected to the plunger of the syringe 13 while its other arm 51 carries a cam follower 53 in operative contact with a cam 55. The bell crank is pivoted about a shaft 57 which also pivotally carries a beam 59. The beam 59, which is connected to the plunger of syringe 11, includes a detent 61 in registry with the arm 51 of the bell crank such that its counterclockwise rotation with respect to the bell crank is limited. With clockwise rotation of the bell crank, the beam 59, by the operation of the detent 61, is rotated in a clockwise direction. Both the arm 49 of the bell crank and the beam 59 are resiliently urged in a downward direction by means of the springs 63 and 65. The spring 63 is stronger than the spring 65, such that when released by the cam 55, both the bell crank 47 and the beam 59 are rotated clockwise by the spring 63.

The beam 59 further includes a stop contact 67 for cooperation with a variable stop 69 which will be more fully described hereinafter with respect to FIGURES 1 to 3.

The cam 55 includes four portions, *a*, *b*, *c* and *d*. In conjunction with the syringe 13, the area *a* may be considered the exhaust area whereby the bell crank is rotated in a counterclockwise direction and the plunger 19 of the syringe 13 urged upward to exhaust that syringe. At the same time, since the arm 51 of the bell crank is likewise rotating in the counterclockwise direction the beam 59 is permitted to rotate in a counterclockwise direction under the influence of the spring 65. This movement of the arm 59 carries with it the plunger 19 of the syringe 11 whereby that syringe undertakes an intake operation. This intake stroke of the syringe 11 may be interrupted by the stop contact 67 meeting the variable stop 69 whereby further rotation of the bell crank 47 merely provides a gap between the arm 51 and the detent 61. During this time the stop clock assemblies 29 and 31 are disposed such that the line 33 is in communication with the line 35 and the line 41 is in communication with the line 43. Suitable driving connections are provided such that the cam 55 is driven synchronous with the stop cock assemblies 29 and 31.

As the cam 55 continuously rotates such that the area *b* is in contact with the cam follower 53, the system undertakes a dwell period whereby neither of the syringes 11 or 13 are operating. During this time the stop cock assemblies 29 and 31 provide no communication to or from the lines 33 or 41.

As the cam 55 rotates further into the area *c*, the bell crank 47 is permitted to rotate in a clockwise direction under the influence of the spring 63. At the beginning of this clockwise rotation of the bell crank 47, the arm 51 may or may not contact the detent 61 dependent upon the position of the variable stop 69. If the variable stop 69 has prevented the beam 59 from completely following the bell crank 47, the initial clockwise rotation of the bell crank will merely serve to close the gap between the arm 51 and the detent 61. Further rotation of the bell crank 47, however, will cause simultaneous rotation of the beam 59 whereby the plunger 19 of the syringe 11 is urged upward into the barrel thereof to provide an exhaust stroke of that syringe, while the syringe 13 is undergoing an intake stroke.

During this time the stop cock assemblies 29 and 31 provide communication between the lines 33 and 37 and between the lines 41 and 39, respectively.

With this operation it is apparent that the intake stroke of the syringe 13 will at first draw its fluid from the supply 45 until the exhaust stroke of the syringe 11 begins. As soon as the exhaust stroke of the syringe 11 begins, it would apply the full input to the syringe 13. This occurs due to the identical sizes of the syringes 11 and 13 and further due to the similar stroke velocity of the two. In this respect it should be realized that the plungers 19 and the syringes 11 and 13 are located from the shaft 57 by equal distances. In addition, it should be noted, with the syringes 11 and 13 parallel to each other, that the beam 59 is colinear with the arm 49 (when the arm 49 is being moved) such that the vertical movement of the plungers 19 are equal.

As the cam 55 continues to rotate in the area *d*, another dwell period is instituted whereby the plungers 19 are not moved. During this position the valves of the stop cock assemblies 29 and 31 change position.

In view of the foregoing it should be realized that the cycle of the master syringe 13 is 90° exhaust, 90° dwell, 90° intake and 90° dwell. During the exhaust time the output of the syringe 13 is connected to the manifold of the syringe 15 through the lines 41 and 43 of the assembly 31. Thus a pulsating flow appears at the line 43 and at the manifold of the syringe 15, the pulsations including 90° of flow and 270° of non-flow.

The purpose of the auxiliary syringe 15 is to translate this pulsating to an even flow. The syringe 15 is of the same dimensions as the syringes 11 and 13 and is operated by a bell crank 71 having arms 73 and 75. The arm 73 is connected to the plunger 19 of the syringe 15 while the arm 75 carries the cam follower 77 in operative relationship with the cam 79.

The cam 79 includes two portions A and B. Portion A of the cam 79 may be considered the intake portion for the syringe 15, while portion B is considered the exhaust portion. Thus, with the cams 55 and 79 considered as connected to the same shaft portion *a* of cam 55 and portion A of cam 79 are in operative relationship with their associated cam followers 53 and 77 simultaneously. Thus, the syringe 15 forms its intake stroke at the same time the syringe 11 exhausts. The comparative shapes of the cams 55 and 79 are such that the syringe 15 draws three-quarters of the total output of the syringe 13. Thus, during this 90° of cam rotation only 25% of the exhaust from the syringe 13 is passed through the final output line 81. During the remaining 270° of cam rotation, the syringe 15 exhausts its intake into the line 81 wherein an even fluid flow results in the line 81.

It should be realized that other means may be provided to insure that the syringe 15 draws three quarters of the output from syringe 13. Such other means may include a syringe such as 15 having a cross sectional area smaller than that of syringe 13.

Referring to FIGURES 1, 2 and 3, a more detailed view of one embodiment of the invention is shown. In these figures like reference numerals are used to distinguish elements similar to those set forth in FIGURE 4.

The system shown schematically in FIGURE 4, is mounted, as shown in FIGURES 1, 2 and 3, on a base member 101 including an upright standard 103. The upper portion of the standard 103 includes a cross bar 105, the extremities of which receive the various manifolds 21 of the syringes 11, 13 and 15. The shaft 57 is secured within the standard 103 and each of the bell cranks 47 and 71, as well as the beam 59 are pivoted about the shaft 57.

An extension 107 is secured to the standard 103 and a shaft 109 is journaled within the extension. Cams 55 and 79 are securely mounted to the shaft 109 and the shaft in turn is connected through a gear reduction box 111 to an output shaft 113 of a variable speed motor 115.

The gear reduction box 111 includes an additional output shaft 117 which is connected to another gear train 119. The gear train 119 includes a spur gear 121, an adjustable idler gear 123 and a second spur gear 125. The spur gear 125 is connected to the input shaft of still another gear reduction box 127 having a vertical output shaft 129.

The variable stop 69 is secured to the top of the vertical shaft 129 and may be formed of a flat sheet of metal or similar material cut such that the top thereof has a curve corresponding to the function of desired variation in ratio of fluids to be mixed. The flat sheet of metal may then be wrapped in the form of a circle and fitted into the cup 131. Thus, upon rotation of the shaft 129 and of the stop 69 it is noted that the vertical position of the stop beneath the stop contact 67 will be varied. Consequently, as the operation of the apparatus continues the amount of fluid pumped by the syringe 11 will be varied dependent upon the rotary position of the stop 69. Thus, the ratio of the first fluid for the source 36 compared to the second fluid of the source 45 will be determined.

A standard 133 is affixed to the housing of the gear box 127 and includes a shaft 135 journaled therein. The upper end of the shaft includes a first cross arm 137 while the lower end includes a second cross arm 139. The second cross arm 139 extends outward adjacent to the cup 131. The outer perimeter of the cup 131 includes a detent 143 which cooperates with the cross arm 139 to rotate the shaft 135. Thus, the cup 131 rotates to a position whereby the detent 143 is approximately in line with the arm 59. The shaft 135 is rotated such that the cross arm 137 underlies the arm 59. In this position downward movement of the arm is limited such that the variable stop is inoperative. Thus with the cross arms 137 and 139 in place, the operation of the apparatus continues for but a single revolution of the variable stop 69. After the first revolution the syringe 11 is held inoperative whereby fluid from the supply 36 (FIGURE 4) is no longer pumped. In order to permit continued operation of the device for repetitive functions, one of the pins 137 or 139 may be removed.

The stop cocks 29 and 31 are secured in standards 145 and 147 and the various lines 33, 35, 37, 39, 41 and 43 are connected to each of the stop cocks by means of spring clips 149. Mounted on the base 101 is a beaker 151 into which the lines 23 from the syringes 11 and 13 may empty during the bleeding operation.

Figure 5:
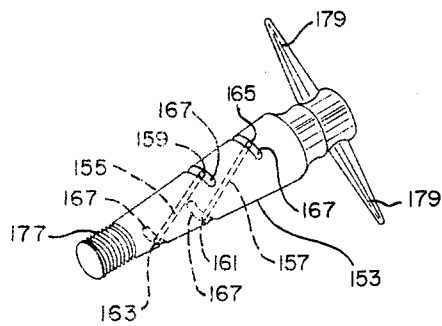
FIGURE 5 is a detailed perspective view of the valve elements utilized in the embodiments shown in the previous figures.

Referring to FIGURE 5, the construction of the stop cock assembly may be more easily understood. FIGURE 5 specifically shows the insert plug employed in the stop cock assembly. As is apparent, the plug includes a generally conical portion 153 having parallel ports 155 and 157. Ports 155 and 157 are disposed at an angle to the axis of the cone 153 such that the opening 159 of the port 155 and the opening 161 of the port 157 lie on a common circle about the cone 153. The opposite openings 163 and 165 of the ports 155 and 157 respectively, are disposed on opposite sides of said circle. In addition to the port openings 159, 161, 163 and 165, the surface of the conical portion 153 is recessed as at 167. The recesses 167 extend about the conical surface in each instance for 90°.

The plug shown in FIGURE 5 is inserted in a matching conically shaped sleeve 169 (FIGURE 3). The conical shaped sleeve includes ports 171 and 173 which register with the openings 163 and 165, respectively. An additional port 175 registers with the openings 169 and 161. Thus upon rotation of the plug of FIGURE 5 within the sleeve 169, the port 175 is alternately placed in communication with the ports 171 and 173 with intermittent times of no communication at all.

As seen in FIGURE 5, the conical shaped portion also includes a bearing surface 177 at one end thereof and dogs 179 at the opposite end thereof. As can be seen in FIGURE 3 the dogs 179 are received in a slotted coupling 181. The coupling 181 includes a spring 183 and plunger 185 which cooperate to urge the tapered portion 153 into the sleeve 169. Thus a relatively close fit is maintained between the tapered plug and the sleeve. The couplings 181 are continuously rotated by means of output shafts 183 of the gear box 111.

It is seen that there is provided cam driven primary pumping and mixing means which are selectively connected for intake and exhaust during dwell periods. There is also provided an auxiliary cam driven pump which serves to take up liquid during exhaust and to supply the same after the exhaust stroke of the primary pumping means, whereby to provide an even flow.

I claim:
1. A fluid gradient engine comprising a first and a second syringe having first and second pistons respectively, a bell crank having one end thereof coupled to the piston of said first syringe, pivot means for pivotally receiving said bell crank, cam means in contact with the other end of the bell crank for driving the same and thus operating the first syringe, an arm having one end pivotally mounted about said pivot means and resiliently urged toward said other end of the bell crank, stop means on said arm for preventing the rotation of the arm with respect to the bell crank beyond a predetermined position, variable position stop means associated with said arm for preventing the rotation of said arm about said pivot means beyond an adjustable position, said arm being connected to the piston of the second syringe, first and second sources of fluid, first valve means connected between said first source of fluid and said second syringe, second valve means connected between said second source of fluid and said first syringe, third valve means connected between said second syringe and said second valve means, means for opening said second and third valve means and closing said first valve means at the same time.

2. A continuous flow pump comprising a first and a second stage pump, each having intake and exhaust strokes, said first pump having a reciprocally driven piston carried in a cylinder and said second pump having another reciprocally driven piston carried in another cylinder, cam means for reciprocally moving said piston of said first pump with respect to the cylinder, whereby to displace fluid, valve means for selectively connecting said first and second pumps for intake and exhaust, said cam including a dwell period during which time said first pump is inactive, means for actuating said valve to change said first pump from intake to exhaust only during such dwell period means coupling the output of the first pump to the input of the second pump, means for operating said second pump in time synchronism with the first pump whereby the amount of intake of the second stage pump in proportion to the output of the first stage pump being the same as the proportion of time of the exhaust stroke of the second pump is to the time of a complete cycle of the first pump and a common output means coupled to the output of the first and second stage pumps.

3. A continuous and even output flow fluid gradient engine comprising a first and a second syringe having first and second pistons respectively, a bell crank having one end thereof coupled to the piston of said first syringe, pivot means for pivotally receiving said bell crank, cam means in contact with the other end of the bell crank for driving the same and thus operating the first syringe to provide an intake and an exhaust stroke, an arm having one end pivotally mounted about said pivot means and resiliently urged toward said other end of the bell crank, stop means on said arm for preventing the rotation of the arm with respect to the bell crank beyond a predetermined position, variable position stop means associated with said arm for preventing the rotation of said arm about said pivot means beyond an adjustable position, said arm being connected to the piston of the second syringe to provide an intake and an exhaust stroke thereof, first and second sources of fluid, first valve means connected between said first source of fluid and said second syringe, second valve means connected between said second source of fluid and said first syringe, third valve means connected between said second syringe and said second valve means, a third syringe, additional cam means for driving said third syringe to provide an input and an exhaust stroke, fourth valve means connected between said first syringe and said third syringe, said cam means and said additional cam means being constructed to provide the intake stroke of said third syringe in time synchronism with the exhaust stroke of the first syringe, the amount of intake of said third syringe in proportion to the output of said first syringe being as the time of the exhaust stroke of the third syringe is proportional to the total time of a complete cycle of the first and third syringes, a common output line coupled to said fourth valve means and said third syringe, and means for operating each of said valve means to alternately open said first and fourth valve means at a first time and to open said second and third valve means at a second time.

4. A fluid gradient engine as in claim 1 in which said variable position stop means include a rotatable cam having a predetermined configuration for continuously varying the ratio of fluids to be mixed.

References Cited by the Examiner

UNITED STATES PATENTS

| | | | |
|---|---|---|---|
| 14,186 | 2/1856 | Root et al. | 103—213 |
| 532,637 | 1/1895 | Browne | 103—9 |
| 595,942 | 12/1897 | McCargo et al. | 103—6 |
| 676,542 | 6/1901 | Luitwieler | 103—213 |
| 1,375,200 | 4/1921 | Barnickel | 103—6 |
| 1,428,204 | 9/1922 | Barnickel | 103—6 |
| 2,448,104 | 8/1948 | Longenecker | 103—168 |
| 2,702,008 | 2/1955 | Stockard | 103—168 |
| 2,914,219 | 11/1959 | Chiantelassa | 103—11 |

FOREIGN PATENTS

| | | |
|---|---|---|
| 256,603 | 7/1912 | Germany. |
| 176,067 | 2/1922 | Great Britain. |
| 208,543 | 9/1924 | Great Britain. |

DONLEY J. STOCKING, *Primary Examiner.*

LAURENCE V. EFNER, *Examiner.*